US012331879B2

(12) United States Patent
Diosady et al.

(10) Patent No.: US 12,331,879 B2
(45) Date of Patent: Jun. 17, 2025

(54) BLOWDOWN VALVE WITH AIR-OIL SEPARATION

(71) Applicant: PRATT & WHITNEY CANADA CORP., Longueuil (CA)

(72) Inventors: Laslo Diosady, Etobicoke (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 559 days.

(21) Appl. No.: 17/839,912

(22) Filed: Jun. 14, 2022

(65) Prior Publication Data
US 2023/0400149 A1 Dec. 14, 2023

(51) Int. Cl.
*B01D 19/00* (2006.01)
*F16N 23/00* (2006.01)

(52) U.S. Cl.
CPC .............. *F16N 23/00* (2013.01); *B01D 19/00* (2013.01); *F05D 2260/602* (2013.01); *F05D 2260/609* (2013.01); *F16N 2210/08* (2013.01)

(58) Field of Classification Search
CPC ..... F16N 23/00; F16N 2210/08; B01D 19/00; F05D 2260/602; F05D 2260/609; F05D 2260/98; F01D 25/18; F01D 25/20; F01D 17/141
See application file for complete search history.

(56) References Cited

U.S. PATENT DOCUMENTS

| | | | |
|---|---|---|---|
| 3,905,382 A * | 9/1975 | Waterston | ............... E03C 1/108 137/218 |
| 4,046,222 A | 9/1977 | Skrivanek et al. | |
| 5,178,184 A * | 1/1993 | Skillman | ................. F16K 15/04 137/533.15 |
| 5,709,242 A * | 1/1998 | Bergen | ..................... F16K 15/04 137/533.17 |
| 6,435,146 B1 | 8/2002 | Kantola et al. | |
| 8,245,818 B2 | 8/2012 | Alecu | |
| 9,765,643 B2 | 9/2017 | Stutz | |
| 11,155,357 B2 | 10/2021 | Zywot | |
| 11,181,010 B2 | 11/2021 | Kostka et al. | |
| 11,383,854 B2 | 7/2022 | Blewett | |

(Continued)

OTHER PUBLICATIONS

European Patent Office, Communication re. extended European search report for European patent application No. 23178941.3, Oct. 19, 2023.

*Primary Examiner* — Dung H Bui
(74) *Attorney, Agent, or Firm* — Norton Rose Fulbright Canada LLP

(57) ABSTRACT

Blowdown valves and associated methods for separating oil and air in a lubrication system of an aircraft engine are provided. A method includes receiving a mixture of air and oil at a blowdown valve including a valve member movable between a valve-closed position and a valve-open position. With the valve member in the valve-open position, the method includes impinging the mixture against the valve member. A first portion of the mixture having a first fraction of oil is released from the blowdown valve upstream of the valve member. A second portion of the mixture having a second fraction of oil greater than the first fraction of oil is guided around and past the valve member. The second portion of the mixture is released from the blowdown valve downstream of the valve member.

20 Claims, 9 Drawing Sheets

(56) References Cited

U.S. PATENT DOCUMENTS

| | | |
|---|---|---|
| 2009/0183950 A1 | 7/2009 | Brouillet |
| 2018/0355987 A1 | 12/2018 | Stachowiak |
| 2019/0032811 A1 | 1/2019 | Brito |
| 2023/0400149 A1 | 12/2023 | Diosady |

* cited by examiner

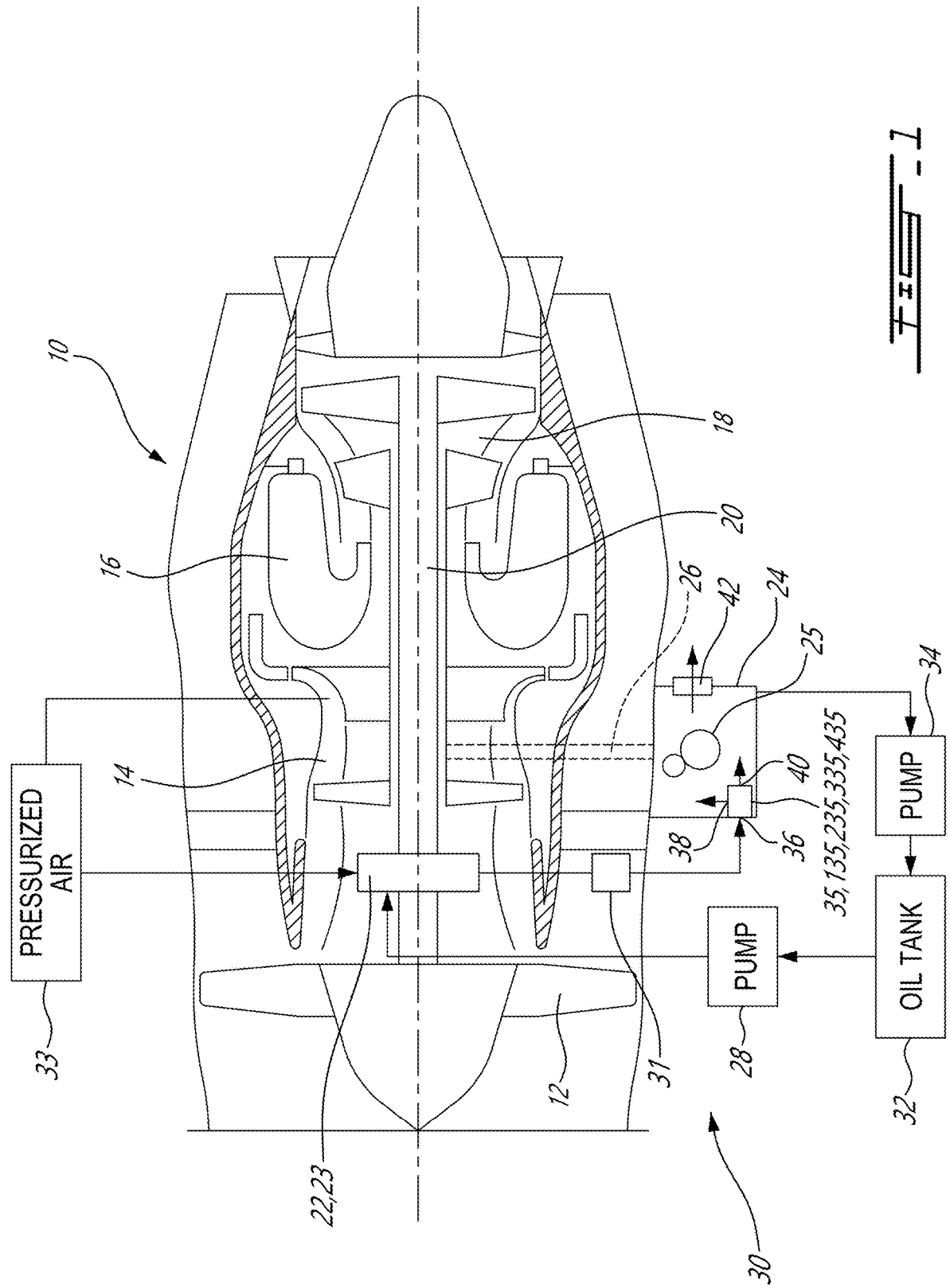

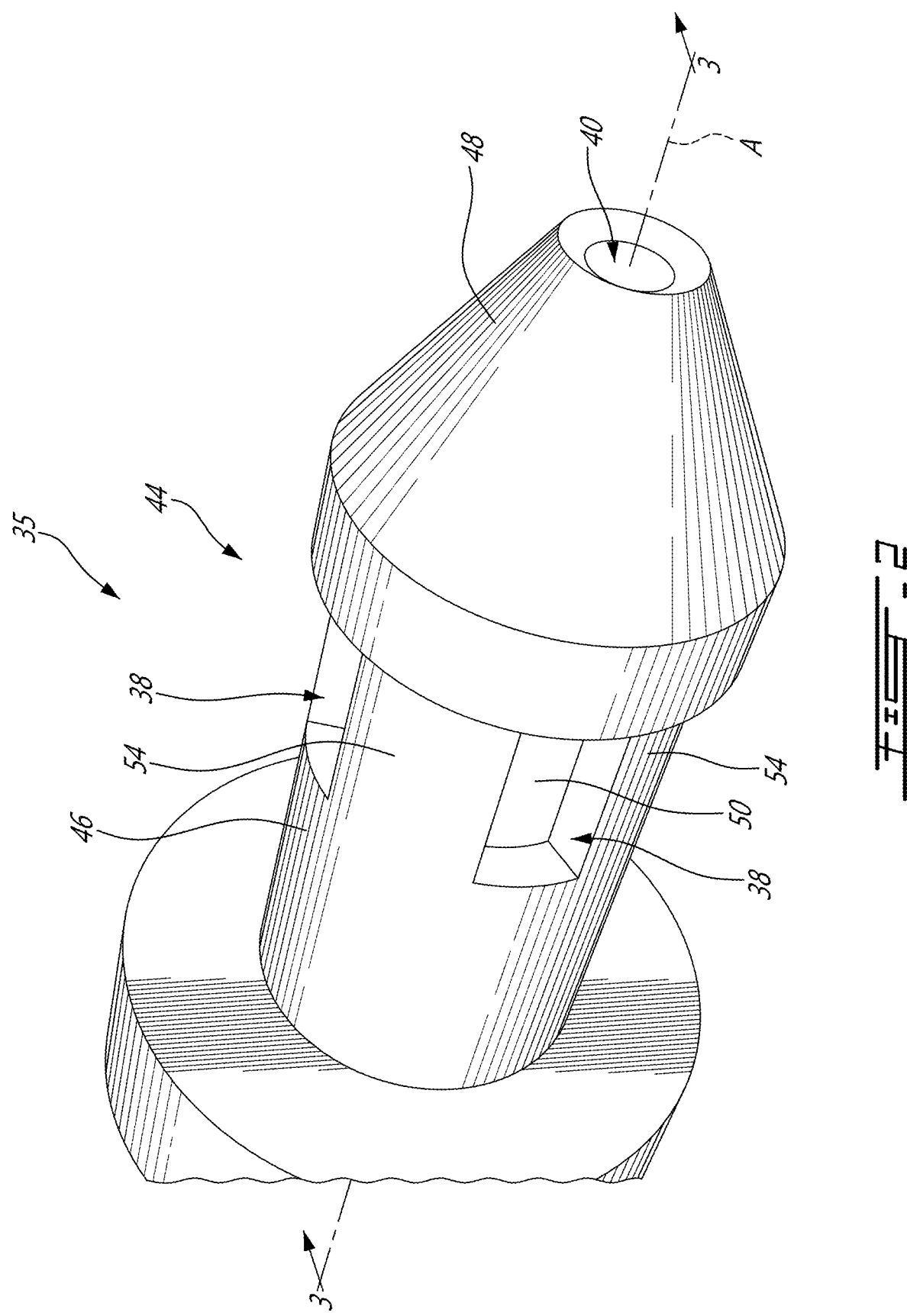

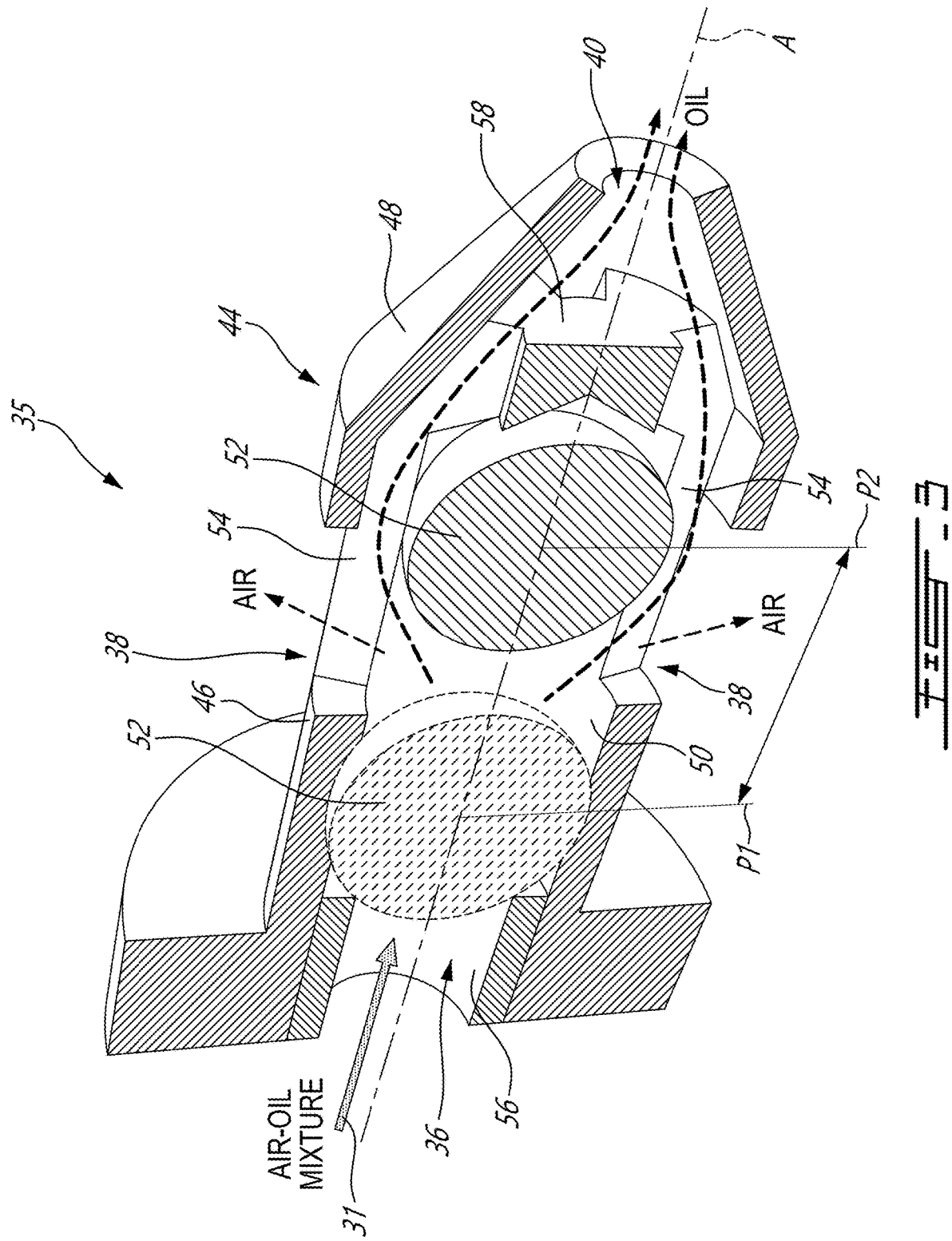

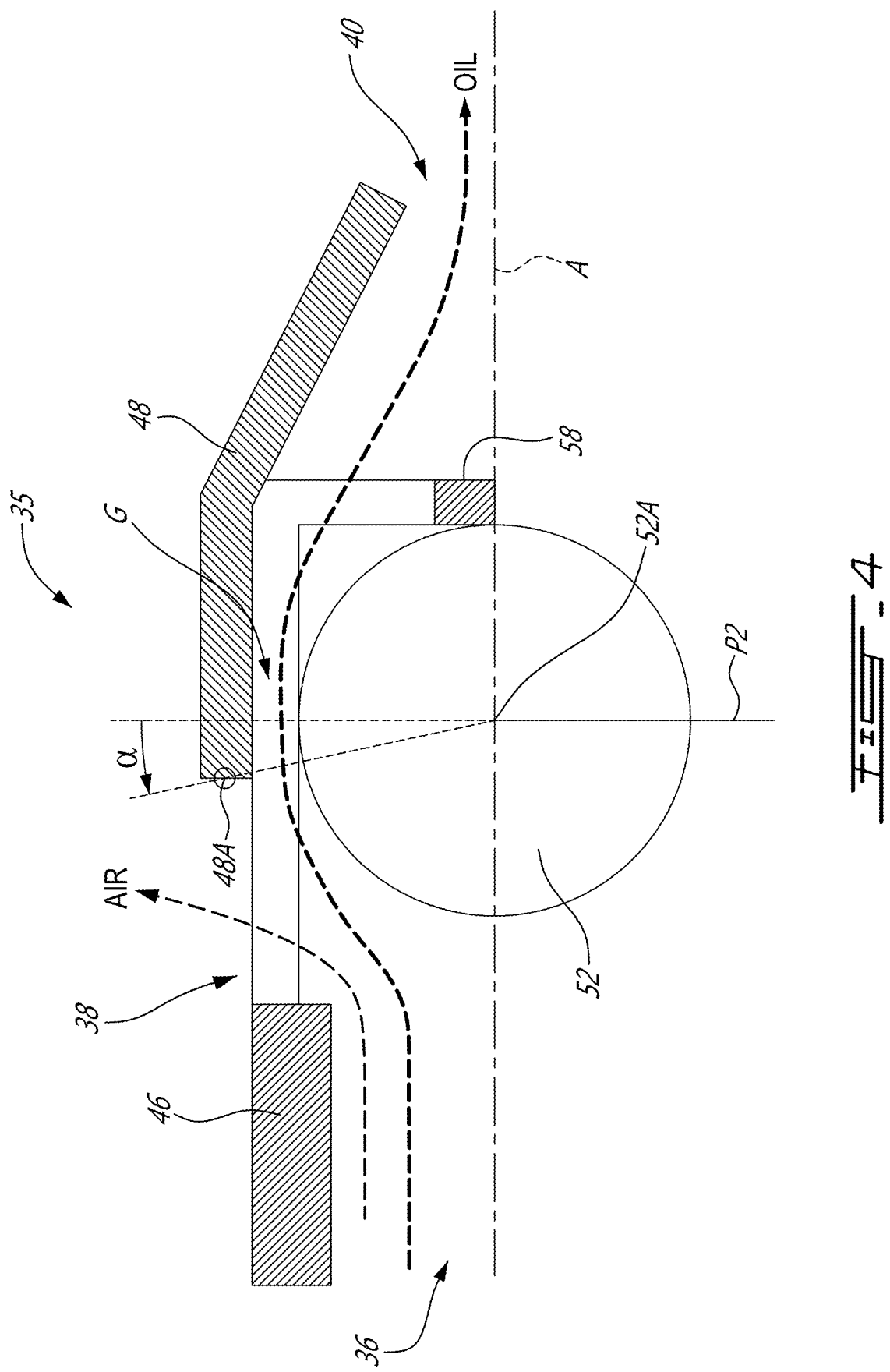

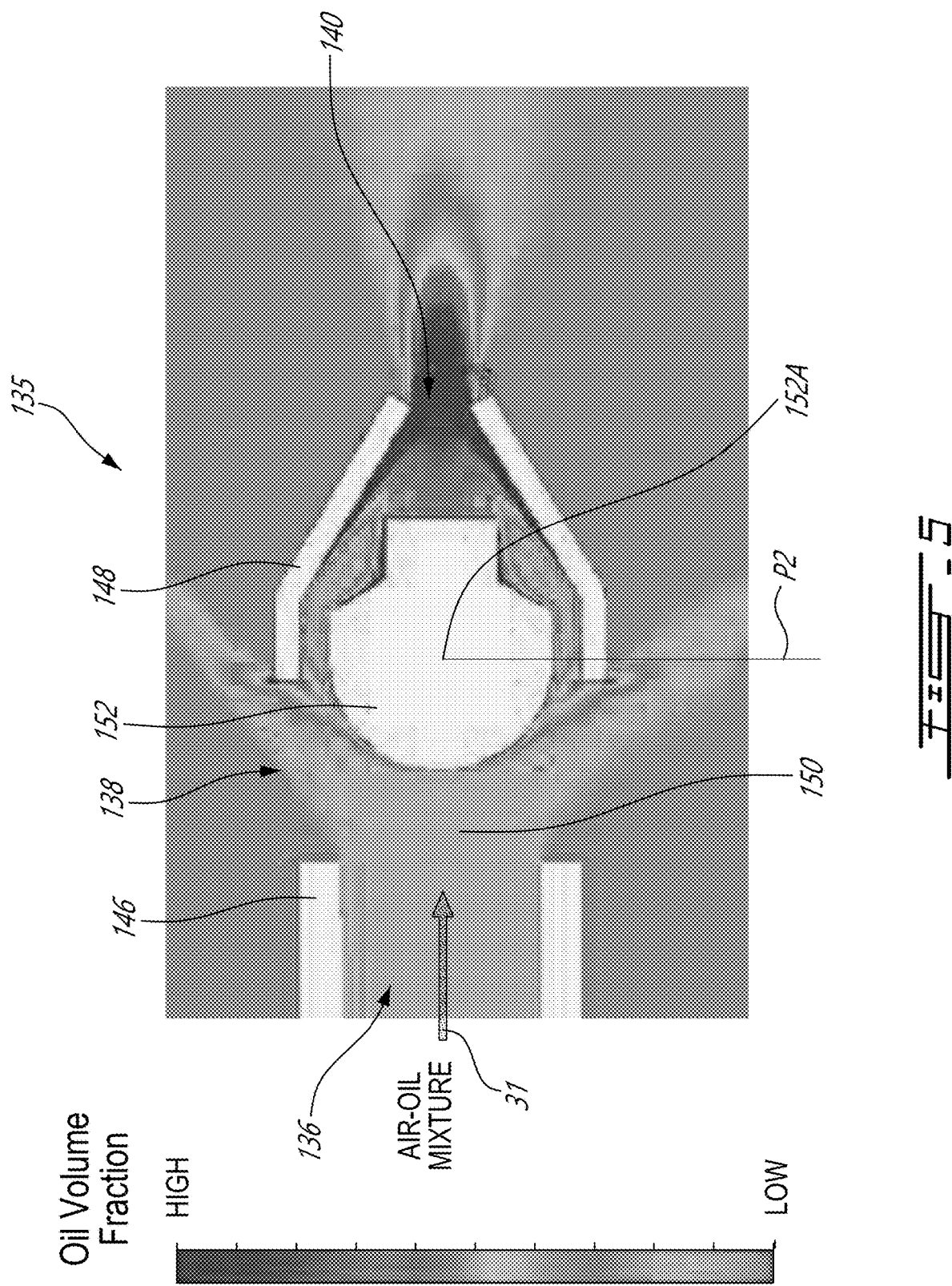

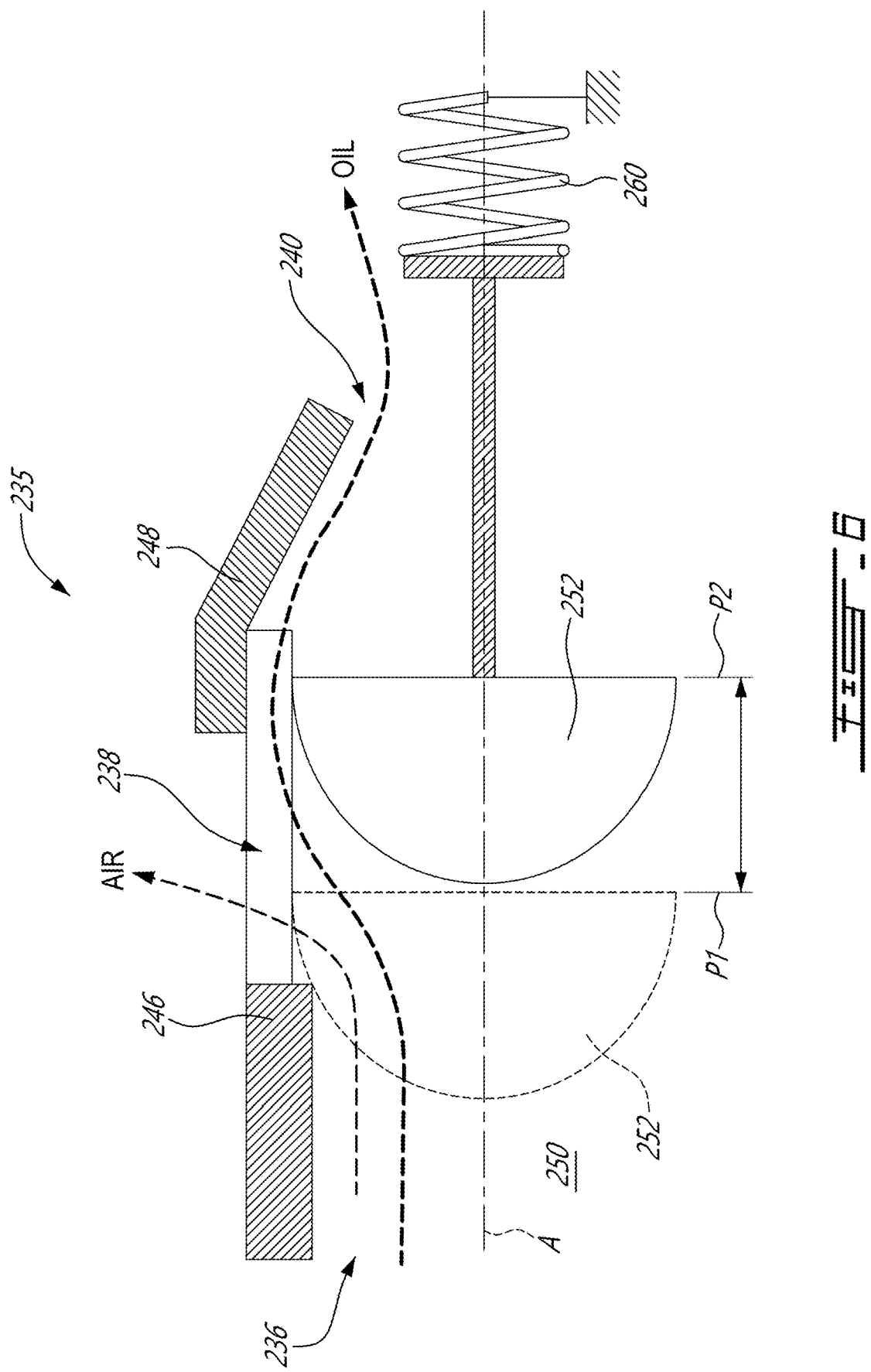

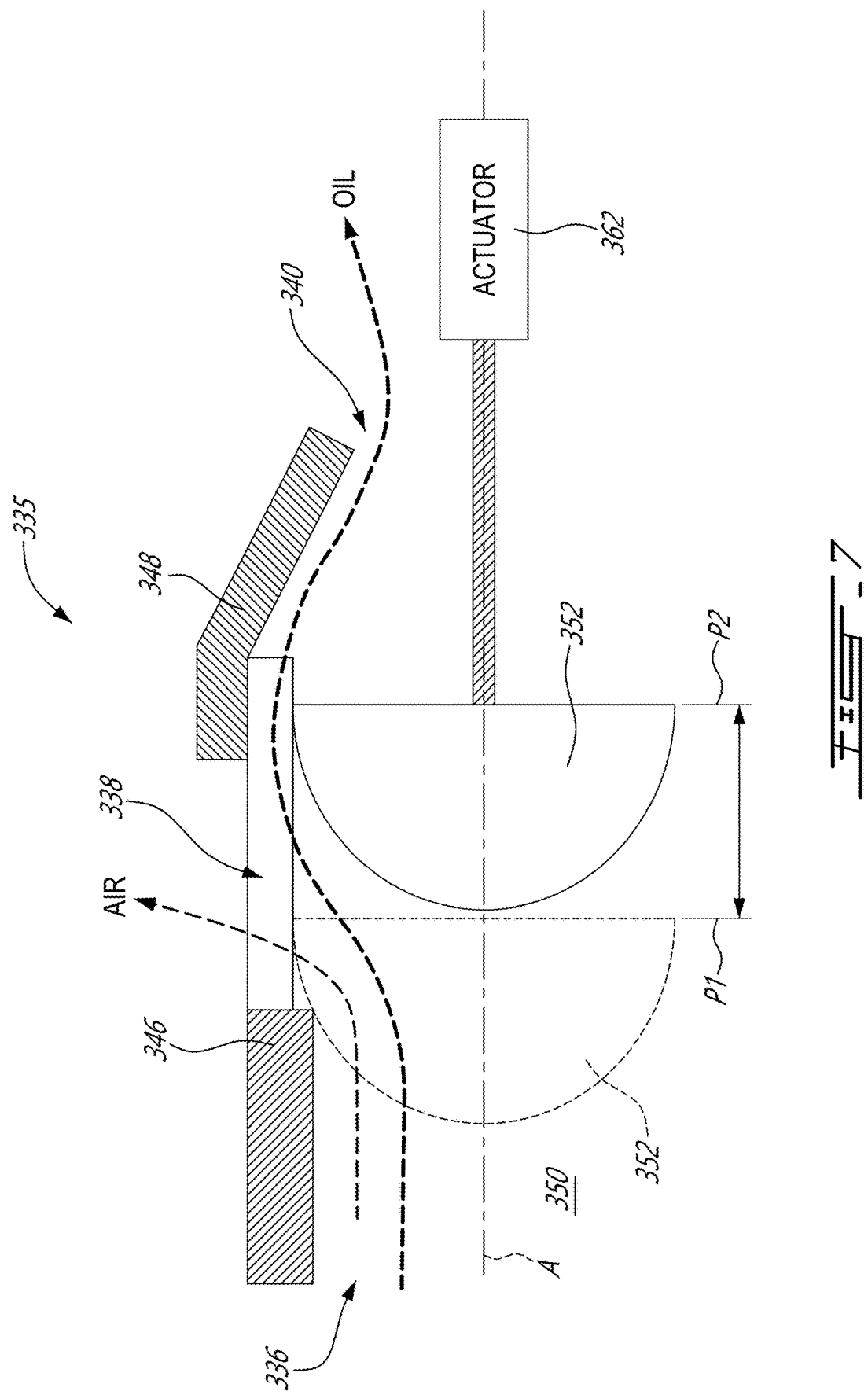

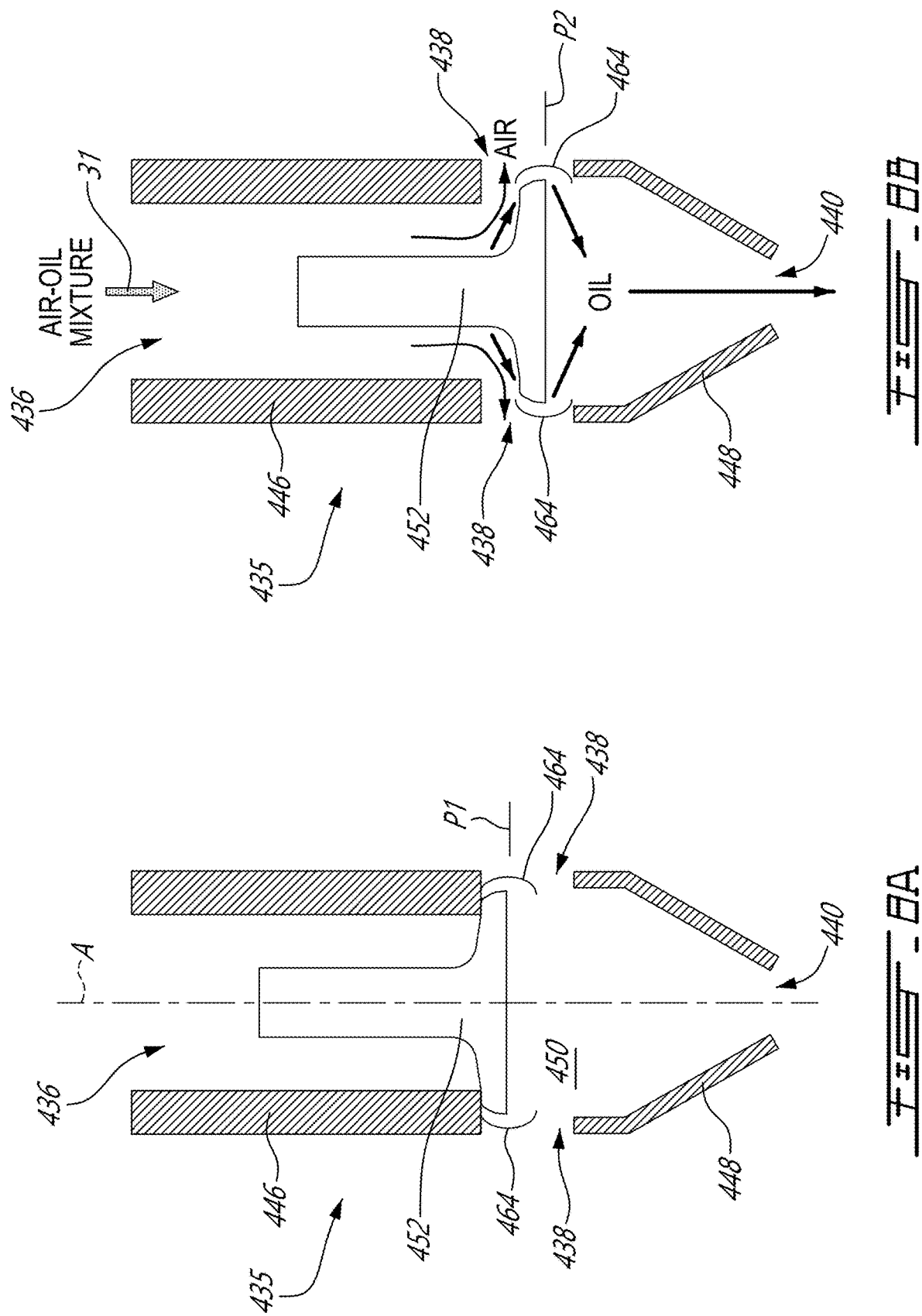

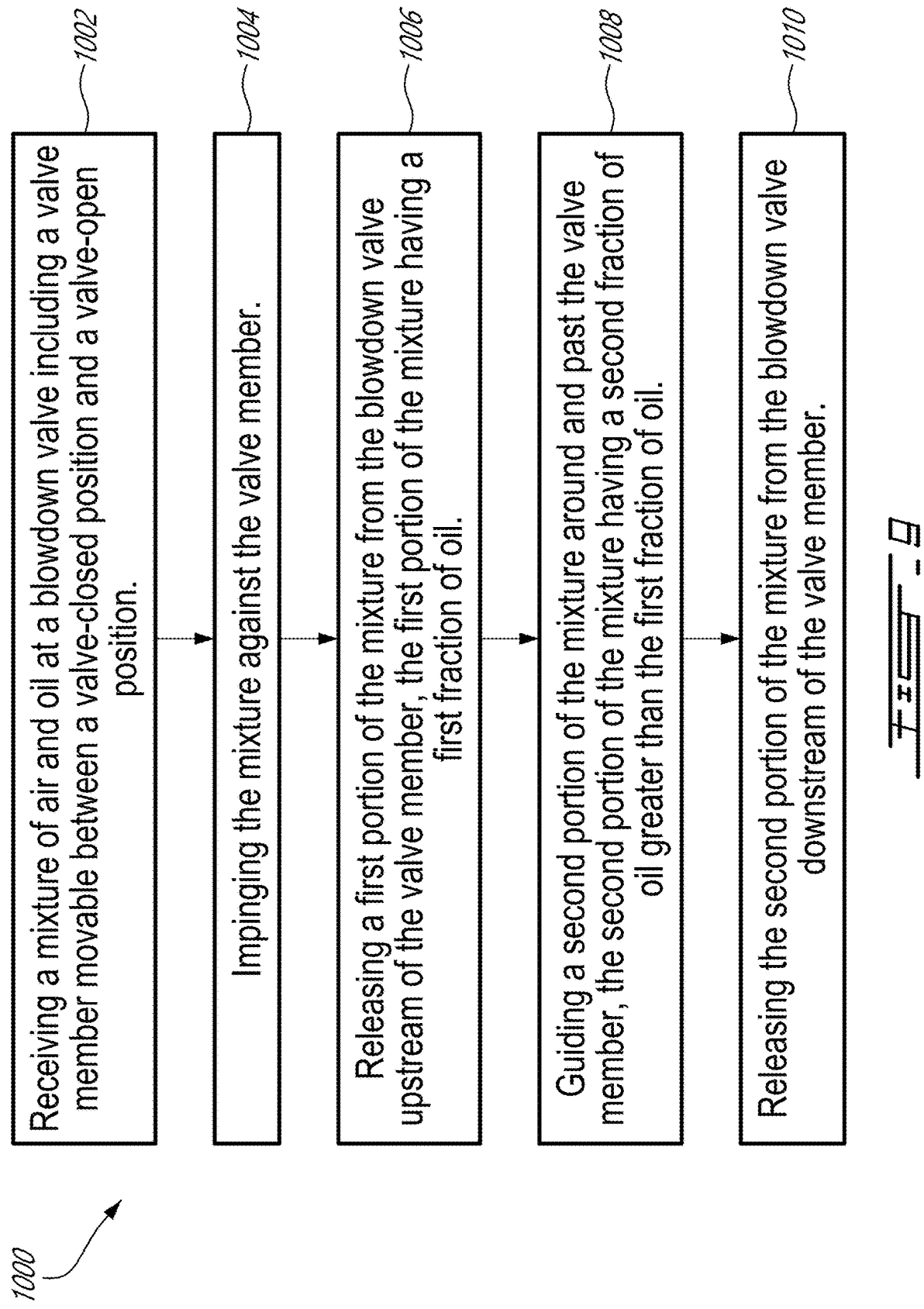

BLOWDOWN VALVE WITH AIR-OIL SEPARATION

TECHNICAL FIELD

The disclosure relates generally to aircraft engines, and more particularly to lubrication systems of aircraft engines.

BACKGROUND

Aircraft (e.g., gas turbine) engines have rotors that are rotatably supported by bearings. The bearings are supplied with oil which may be scavenged from the bearing chambers (sometimes called "bearing cavities"), and processed (e.g., cooled, filtered, deaerated) for recycling. In a gas turbine application, the presence of pressurized air for sealing the bearing chamber in combination with a rotor interacting with the oil and rotating at thousands of revolutions per minute (RPM) can result in an air-oil mixture being formed. The forming of the air-oil mixture can make scavenging of the oil more challenging.

SUMMARY

In one aspect, the disclosure describes a blowdown valve for an aircraft engine lubrication system. The blowdown valve comprises:
a valve body defining:
a chamber;
an inlet for receiving a mixture of air and lubricating fluid into the chamber;
a first outlet for releasing a first portion of the mixture out of the chamber; and
a second outlet for releasing a second portion of the mixture out of the chamber, the second outlet being disposed downstream of the first outlet relative to the inlet; and
a valve member disposed inside the chamber of the valve body, the valve member being translatable between:
a valve-closed position where the valve member hinders fluid flow through the inlet; and
a valve-open position where:
fluid flow is permitted through the inlet;
fluid flow is permitted from the inlet to the first outlet and to the second outlet; and
the valve member is disposed between the inlet and the second outlet.

In another aspect, the disclosure describes an aircraft engine lubrication system comprising:
a first chamber containing a first lubrication load and receiving oil and pressurized air;
a second chamber containing a second lubrication load and receiving a mixture of the oil and the pressurized air from the first chamber; and
a check valve, the mixture of the oil and the pressurized air from the first chamber being delivered to the second chamber via the check valve, the check valve including:
a valve body defining:
a valve chamber;
an inlet for receiving the mixture into the valve chamber;
a first outlet for releasing a first portion of the mixture out of the valve chamber; and
a second outlet for releasing a second portion of the mixture out of the valve chamber, the second outlet being disposed downstream of the first outlet relative to the inlet; and
a valve member disposed inside the valve chamber of the valve body, the valve member being translatable between:
a valve-closed position where the valve member hinders fluid flow through the inlet; and
a valve-open position where:
a first fluid passage is defined from the inlet to the first outlet; and
a second fluid passage is defined from the inlet to the second outlet, the second fluid passage extending around and past the valve member.

In a further aspect, the disclosure describes a method for separating oil and air in a lubrication system of an aircraft engine. The method comprises:
receiving a mixture of air and oil at a blowdown valve including a valve member movable between a valve-closed position where a flow of the mixture through the blowdown valve is hindered, and a valve-open position where a flow of the mixture through the blowdown valve is permitted;
with the valve member in the valve-open position:
impinging the mixture against the valve member;
releasing a first portion of the mixture from the blowdown valve upstream of the valve member, the first portion of the mixture having a first fraction of oil;
guiding a second portion of the mixture around and past the valve member, the second portion of the mixture having a second fraction of oil greater than the first fraction of oil; and
releasing the second portion of the mixture from the blowdown valve downstream of the valve member.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic axial cross-section view of an aircraft (e.g., turbofan gas turbine) engine including a blowdown valve as described herein;

FIG. 2 is a perspective view of an exemplary blowdown valve of the aircraft engine of FIG. 1;

FIG. 3 is a perspective cross-sectional view of the blowdown valve of FIG. 2 taken along line 3-3 in FIG. 2, with the valve member of the blowdown valve being shown in both a valve-open position and a valve-closed position;

FIG. 4 is a partial schematic axial cross-sectional view of the blowdown valve of FIG. 2;

FIG. 5 is a plot showing results of a computational fluid dynamics (CFD) simulation of a flow of an air-oil mixture through another exemplary blowdown valve of the aircraft engine of FIG. 1;

FIG. 6 is a partial schematic axial cross-sectional view of another exemplary blowdown valve;

FIG. 7 is a partial schematic axial cross-sectional view of another exemplary blowdown valve;

FIGS. 8A and 8B are schematic axial cross-sectional views of another exemplary blowdown valve with a valve member in a valve-closed position and in a valve-open position respectively; and FIG. 9 is a flow diagram of a method of separating oil and air in a lubrication system of an aircraft engine.

DETAILED DESCRIPTION

The present disclosure describes lubrication systems of aircraft engines including blowdown valves, and associated methods. In some embodiments, the blowdown valves and methods described herein may promote air-oil separation and facilitate scavenging of the oil for recycling.

In a bearing chamber receiving oil and pressurized air (e.g., to provide sealing) and where a rotor rotating at relatively high speed is interacting with oil, an air-oil mixture (i.e., mist) may be produced inside the bearing chamber. The air-oil mixture may then be vented from the bearing chamber into another chamber (e.g., gearbox) containing another lubrication load (e.g., gears) prior to being scavenged and processed (e.g., cooled, filtered, deaerated) for recycling. The air-oil mixture introduced into the other chamber may interact with internal flow patterns inside of the other chamber and potentially increase mist density within the other chamber, which may be undesirable.

In some embodiments, the blowdown valves and methods described herein may promote air-oil separation of the air-oil mixture at the point of entry into the other chamber. In some embodiments, such air-oil separation may promote a reduction in oil misting within the other chamber and may facilitate scavenging of the oil from the other chamber. In some situations, the reduction in oil misting may potentially reduce churning losses in a gearbox, and/or reduce the potential for a pressure buildup inside of the other chamber due to a breather port getting clogged with oil for example.

The terms "connected" and "coupled" may include both direct connection and coupling (in which two elements contact each other) and indirect connection and coupling (in which at least one additional element is located between the two elements).

Aspects of various embodiments are described through reference to the drawings.

FIG. 1 illustrates an aircraft engine 10 (referred hereinafter as "engine 10") depicted as a turbofan gas turbine engine of a type preferably provided for use in subsonic flight, generally comprising, in serial flow communication, fan 12 through which ambient air is propelled, compressor section 14 for pressurizing the air, combustor 16 in which the compressed air is mixed with fuel and ignited for generating an annular stream of hot combustion gases, and turbine section 18 for extracting energy from the combustion gases. It is understood that the systems, devices (e.g., blowdown valves) and methods described herein may be used on other types of aircraft engines such as internal combustion (e.g., piston, rotary) engines, and various types of (e.g., turbofan, turboshaft, turboprop) gas turbine engines that may be used to propel an aircraft, or that may be used as auxiliary power unit(s) onboard an aircraft.

Engine 10 may include one or more lubrication loads (e.g., rotors, shafts, bearings, gears). For example, shaft 20 may be rotatably supported within engine 10 by (e.g., roller, journal) bearing 22 and by one or more other bearings (not shown). Shaft may be a low-pressure shaft of engine 10 but bearing 22 may instead support a high-pressure shaft or another shaft of engine 10. Bearing 22 may be disposed inside bearing chamber 23 and may be operatively disposed between shaft 20 and suitable support structure (e.g., casing) of engine 10. Engine 10 may include another chamber such as gearbox 24 including gears 25 arranged to define one or more (e.g., speed reducing or speed augmenting) gear trains. In some embodiments, gearbox 24 may be an accessory gearbox (AGB) that may receive motive power from shaft 20 or from another shaft of engine 10 (e.g., via tower shaft 26) and drive one or more accessories such as an electric generator and/or oil pumps 28, 34 for example. Gearbox 24 may have an input drivingly coupled to tower shaft 26 and one or more outputs respectively drivingly coupled to the one or more accessories via accessory mounting pads.

Engine 10 may include lubrication system 30 (referenced hereinafter as "system 30") for supplying oil from oil tank 32 to bearing 22 of bearing chamber 23, to gears 25 of gearbox 24, and/or to one or more other lubrication loads. System 30 may include one or more oil pressure pumps 28 for driving oil from oil tank 32 to bearing 22, to gearbox 24, and optionally to other lubrication loads. Air-oil mixture 31 from bearing chamber 23 may be vented from bearing chamber 23 and then supplied to one or more downstream chambers (e.g., gearbox 24) containing other lubrication loads before being scavenged from the downstream chamber and returned to oil tank 32. System 30 may include one or more oil scavenge pumps 34 for evacuating the oil from gearbox 24 and optionally from other lubrication loads, and returning the oil to oil tank 32 for eventual reuse (i.e., recycling). System 30 may include other components for processing (e.g., cooling, filtering, deaerating) the oil in preparation for recycling the oil.

Pressure pump 28 may deliver oil from oil tank 32 to bearing 22 for lubrication and cooling purposes. One or more seals of bearing chamber 23 in which bearing 22 is disposed may also receive pressurized air 33 to prevent the oil from leaking out of bearing chamber 23. In some embodiments, pressurized air 33 may be supplied from compressor section 14 via a suitable bleed port. Some of pressurized air may flow into bearing chamber 23 and mix with the oil inside of bearing chamber 23. The rotating shaft supported by bearing 22 may cause misting of the oil inside of bearing chamber 23. As a result, air-oil mixture 31 may be generated inside of bearing chamber 23, vented from bearing chamber 23 and directed toward gearbox 24 or other downstream chamber(s) disposed in series with bearing chamber 23 in system 30.

System 30 may include blowdown valve 35 (also referred hereinafter as "valve 35"). Air-oil mixture 31 vented from bearing chamber 23 may be directed to a downstream chamber such as gearbox 24 via valve 35. Valve 35 may a blowdown type of valve serving to control a (e.g., continuous) flow of air-oil mixture 31 being vented from bearing chamber 23 and injected into to gearbox 24 due to a differential pressure between bearing chamber 23 and gearbox 24. During normal operation of engine 10, the pressure inside of bearing chamber 23 may be greater than the pressure inside of gearbox 24 thereby causing air-oil mixture 31 to flow from bearing chamber 23 to gearbox 24.

In some embodiments, valve 35 may be configured as a check valve (i.e., non-return valve, one-way valve) that normally allows fluid to flow through it in only one direction. For example, valve 35 may be configured to allow air-oil mixture 31 vented from bearing chamber 23 to flow into gearbox 24, but may prevent flow from gearbox 24 toward bearing chamber 23 in the event of a reversal of the pressure differential.

Valve 35 may have inlet 36 for receiving air-oil mixture 31 from bearing chamber 23, one or more first outlets 38 for releasing a first portion of air-oil mixture 31 into gearbox 24, and one or more second outlets 40 for releasing a second portion of air-oil mixture 31 into gearbox 24. As explained below, valve 35 may promote air-oil separation of the received air-oil mixture 31 upon entry into gearbox 24. The second portion of air-oil mixture 31 released from valve 35 may have a greater (e.g., volume, mass) fraction of oil than the first portion of air-oil mixture 31 released from valve 35. For example, in some situations, the air from air-oil mixture 31 may be primarily released from valve 35 via first outlet 38, and the oil from air-oil mixture 31 may be primarily released from valve 35 via second outlet 40.

Valve 35 may be installed on an internal wall of gearbox 24 so that first outlet 38 and second outlet 40 may be respectively directed toward suitable locations within gearbox 24. For example, valve 35 may be at least partially disposed inside of gearbox 24. For example, first outlet 38 and second outlet 40 may be at different orientations and/or locations to reduce or discourage misting of the oil within gearbox 24. For example, first outlet 38 may be oriented to promote the flow of air discharged from first outlet 38 toward breather port 42 via which some of the air inside of gearbox may be vented overboard. On the other hand, second outlet 40 may be oriented toward a relatively quiet location (e.g., toward a proximate wall, toward a lower location) within gearbox 24 to discourage entrainment of the oil with the turbulence inside of gearbox 24 and thereby discourage misting. For example, second outlet 40 may be oriented to discourage the flow of oil toward breather port 42 to reduce the potential for breather port 42 getting contaminated (choked) with oil. In some embodiments, the locations and/or orientations of first outlet 38 and second outlet 40 may be selected based on expected fluid flow patterns induced within gearbox 24.

Aspects of the present disclosure may be used with other types of lubrication loads (e.g., rotors, shafts, gears). For example, valve 35 may be used to control the flow of air-oil mixture 31 between two suitable lubrication loads disposed in series along a lubrication circuit and having a pressure differential therebetween. Even though oil is referenced herein as a lubricating fluid, it is understood that blowdown valves and methods described herein may be suitable for use with other fluids such as fuel or other liquid cooling fluids for example.

FIG. 2 is a perspective view of an exemplary blowdown valve 35, which may be part of system 30. Valve 35 may include valve body 44. Valve body 44 may have a unitary construction (i.e., single piece), or may include a plurality of components assembled together. Valve body 44 may be made from a suitable metallic material such as steel. Valve body 44 may include cage 46 and nozzle 48, which may be integrally formed, or that may be assembled together by threaded engagement or by welding.

Cage 46 may have a generally cylindrical shape having (e.g., linear) central axis A extending therealong. Cage 46 may have a hollow interior and may define valve chamber 50 for receiving valve member 52 (shown in FIG. 3) therein. Cage may be fenestrated to permit fluid flow out of valve chamber 50. For example, one or more first outlets 38 may be defined in a circumferential wall of cage 46. In some embodiments, first outlets 38 may include a plurality of openings (e.g., windows, through slots, through channels) defined in cage 46 and angularly spaced apart about central axis A. First outlets 38 may be separated by bars 54. In some embodiments, cage 46 may include four first outlets 38 (e.g., equally) spaced apart about central axis A. In some embodiments, central axis A may intersect inlet 36, valve member 52 and second outlet 40. Second outlet(s) 38 may include openings that are oriented transversely (e.g., perpendicular) to central axis A.

Nozzle 48 may be disposed at or over a distal (e.g., downstream) end of cage 46 and may define second outlet 40. Nozzle 48 and second outlet 40 may be disposed downstream of first outlet(s) 38 relative to inlet 36 (shown in FIGS. 1 and 3) and to the general flow direction of air-oil mixture 31 inside of valve 35. Nozzle 48 may have a converging configuration where a cross-sectional area of nozzle 48 may diminish toward second outlet 40 in a streamwise direction. The configuration of nozzle and the size of second outlet 40 may be selected based on an expected flow rate of oil expected through nozzle 48 determined experimentally or by simulation and modelling. In various embodiments, a cross-sectional area of second outlet 40 may be 2.5 times to 10 times smaller than a cross-sectional area of inlet 36.

Inlet 36 may serve to receive air-oil mixture 31 vented from bearing chamber 23 into valve chamber 50 of valve 35. First outlet(s) 38 may serve to release a first portion of air-oil mixture 31 out of valve chamber 50 and into gearbox 24. Second outlet(s) 40 may serve to release a second portion of air-oil mixture 31 out of valve chamber 50 and into gearbox 24. Second outlet 40 may be disposed downstream of first outlet(s) 38 relative to the inlet 36 and to the general flow direction through valve 35. In other words, first outlet(s) 38 may be disposed between inlet 36 and second outlet 40 along central axis A.

Valve member 52 (shown in FIG. 3) may be disposed inside of valve chamber 50 defined by cage 46. Valve member 52 may be translatable between a valve-closed position and a valve-open position along central axis A. In FIG. 2, valve member 52 may be in the valve-open position so that the view of valve member 52 may be obstructed by nozzle 48, and hence valve member 52 not being visible in FIG. 2.

FIG. 3 is a perspective cross-sectional view of valve 35 of FIG. 2 taken along line 3-3 in FIG. 2. FIG. 3 shows a first instance of valve member 52 in valve-closed position P1 in broken lines, and a second instance of valve member 52 in valve-open position P2 in solid lines. The two instances of valve member 52 are intended to illustrate the range of movement (e.g., translation) of valve member 52 inside of valve chamber 50 and along central axis A of cage 46. Cage 46 may serve as a guide for the movement of valve member 52 inside of valve chamber 50.

Valve body 44 may include keeper 56, which may be inserted into cage and attached to cage 46 to prevent valve member 52 from escaping valve chamber 50. The absence of keeper 56 may permit the insertion of valve member 52 into valve chamber 50. Keeper 56 may be an annular member made from a metallic material and that is assembled cage 46 by threaded engagement for example. Keeper 56 may also define a valve seat for interacting with valve member 52 when valve member 52 is at valve-closed position P1 where valve member 52 hinders (e.g., prevents) fluid flow through inlet 36. Keeper 56 may define an upstream translation limit for valve member 52.

Cage 46 may include end cap 58 at a distal (e.g., downstream) end thereof. End cap 58 may interact with valve member 52 when valve member 52 is at valve-open position P2. End cap 58 may define a downstream translation limit for valve member 52. The fenestration of cage 46 may extend through end cap 58 permit the flow of air-oil mixture 31 around valve member 52 and out of outlet 40 when valve member 52 at valve-open position P2.

In relation to the general flow direction of air-oil mixture 31, an upstream surface of valve member 52 facing inlet 36 and facing the incoming flow of air-oil mixture 31 may have a bulbous shape. For example, the upstream surface of valve member 52 may have a spherical shape so that valve member 52 may define part of a sphere. In some embodiments, valve member 52 may be a metallic ball (e.g., sphere) that is translatable inside of valve chamber 50 and along central axis A.

During normal operation of valve 35, the pressure at the lubrication load (e.g., bearing chamber 23) upstream of valve 35 may be greater than the pressure at the lubrication load (e.g., gearbox 24) downstream of valve 35. Accordingly, the pressure differential may cause valve member 52 to be translated toward valve-open position P2 so that air-oil mixture 31 may enter valve chamber 50 via inlet 36. When valve member 52 is at valve-open position P2, one or more first fluid passages may be defined from inlet 36 to first outlet(s) 38. When valve member 52 is at valve-open position P2, one or more second fluid passages may be defined from inlet 36 to second outlet 40. The second fluid passage(s) may extend around and past valve member 52, through the fenestration of cage 46, into nozzle 48 and to second outlet 40. Valve member 52 may be disposed between inlet 36 and second outlet 40. Second outlet 40 may be disposed downstream of first outlet(s) 38. When valve member 52 is at valve-open position P2, at least part of first outlet 38 may be disposed upstream of valve member 52.

Air-oil mixture 31 entering valve chamber 50 may impinge against valve member 52. The presence of valve member 52 and the configuration of valve body 44 may promote separation of the air and the oil in air-oil mixture 31 received into valve chamber 50. It is understood that the air-oil separation may not be absolute. For example, some or most of the air (i.e., the portion of air-oil mixture 31 having a lower density) may tend to exit valve chamber 50 radially and out of first outlet(s) 38. On the other hand, some or most of the oil (i.e., the portion of air-oil mixture 31 having a higher density) may tend to flow around valve member 52 and exit valve chamber 50 via the fenestration in cage 46, and exit valve 35 via second outlet 40 defined by converging nozzle 48. In some situations, air-oil mixture 31 may contain more air than oil in terms of volume fraction. In some situations, air-oil mixture 31 may have an oil volume fraction of 15% or less. In some situations, air-oil mixture 31 may have an oil volume fraction of between 5% and 15%. In some situations, air-oil mixture 31 may contain more oil than air in terms of volume fraction.

In some embodiments, valve member 52 may be freely movable so that in the event of a reversal of the pressure differential, valve member 52 would then be urged toward valve-closed position P1 and interact with the valve seat defined by keeper 56 to hinder (e.g., prevent) fluid flow in the reverse direction (e.g., from gearbox toward bearing chamber 23).

FIG. 4 is a partial schematic axial cross-sectional view of valve 35 with valve member 52 shown in valve-open position P2. For clarity and simplicity, FIG. 4 only shows a portion of cage 46 and of nozzle 48 above central axis A. As shown in FIG. 4, upstream end 48A of nozzle 48 may be disposed upstream of center 52A of a sphere including the spherical upstream surface of valve member 52 when valve member 52 is in valve-open position P2. The position of upstream end 48A of nozzle 48 along central axis A may be characterized by angle α measured relative to the center 52A of the spherical valve member 52, relative to an axial position that is axially aligned with center 52A along central axis A, and in a plane that contains central axis A. In some embodiments, upstream end 48A of nozzle 48 may be disposed upstream of center 52A so that angle α may be between 0 and 20°. In some embodiments, upstream end 48A of nozzle 48 may be axially aligned with center 52A so that angle α may be about 0°. In some embodiments, upstream end 48A of nozzle 48 may be disposed downstream of center 52A so that angle α may be between 0 and −15° (i.e., in the opposite direction to that shown in FIG. 4). In various embodiments, angle α may be between 20 and −15° for example.

Upstream end 48A of nozzle 48 may define a capture zone for catching oil that has impinged against valve member 52 and is being deflected radially outwardly by valve member 52. In other words, nozzle 48 may capture the oil deposited on valve member 52 and in a flow stagnation region caused by the relatively high turning acceleration. The layer of oil may tend to move over and around valve member 52 due to the local pressure distribution encouraged by nozzle 48. Nozzle 48 may then guide the oil and some quantity of air toward second outlet 40.

The fenestration in cage 46 and radial gap G between nozzle 48 and valve member 52 may define part of a flow passage establishing fluid communication between inlet and second outlet 40. The flow passage may extend around and past valve member 52. In other words, valve member 52 may provide an obstruction to the general flow direction along central axis A and the flow passage may extend around valve member 52 to bypass the obstruction.

FIG. 5 is a plot showing results of a computational fluid dynamics (CFD) simulation of a flow of an exemplary air-oil mixture 31 through another exemplary blowdown valve 135 (referred hereinafter as "valve 135"). Valve 135 may have elements previously described above in relation to valve 35. Like elements have been identified using reference characters incremented by 100. In various embodiments, valve member 152 may be fully spherical, partially spherical or non-spherical. For example, the upstream surface of valve member 152 facing toward inlet 136 may be bulbous (e.g. convex toward inlet 136). For example, valve member 152 may be partially spherical so that the upstream surface of valve member 152 may be spherical and may have center 152A.

The plot in FIG. 5 shows dark regions of relatively high oil volume fraction and light regions of relatively low oil volume fraction. Air-oil mixture 31 may be received into chamber 150 defined by cage 146, and impinged against the upstream surface of valve member 152. The plot of FIG. 5 shows that the second portion of air-oil mixture 31 that is collected by nozzle 148, guided by nozzle 148 and released from second outlet 140 has a higher volume fraction of oil than the first portion of air-oil mixture 31 that is released from first inlets 138.

FIG. 6 is a partial schematic axial cross-sectional view of another exemplary blowdown valve 235 (referred hereinafter as "valve 235"). For clarity and simplicity, FIG. 6 only shows a portion of cage 246 and of nozzle 248 above central axis A. Valve 235 may have elements previously described above in relation to valve 35. Like elements have been identified using reference characters incremented by 200. FIG. 6 shows a first instance of valve member 252 at valve-closed position P1 shown in broken lines, and a second instance of valve member 252 at valve-open position P2 shown in solid lines. In some embodiments, valve member 252 may be resiliently biased toward valve-closed position P1 by way of spring 260 so that a minimum pressure differential may be required to cause valve member 252 to move toward valve-open position P2.

With valve member 252 in valve-open position P2, air-oil mixture 31 may be received into chamber 250 via inlet 236, and impinged against the upstream surface of valve member 252. The first portion of air-oil mixture 31 may be released from first inlet(s) 238, and the second portion of air-oil mixture 31 may be collected by nozzle 248, guided by nozzle 248 and released from second outlet 240.

FIG. 7 is a partial schematic axial cross-sectional view of another exemplary blowdown valve 335 (referred hereinafter as "valve 335"). For clarity and simplicity, FIG. 7 only shows a portion of cage 346 and of nozzle 348 above central axis A. Valve 335 may have elements previously described above in relation to valve 35. Like elements have been identified using reference characters incremented by 300. FIG. 7 shows a first instance of valve member 352 at valve-closed position P1 shown in broken lines, and a second instance of valve member 352 at valve-open position P2 shown in solid lines. In some embodiments, valve member 352 may be movable (translatable) between valve-closed position P1 and valve-open position P2 by way of actuator 362. Actuator 362 may be a hydraulic or electric actuator and configured to cause translation of valve member 352 as a function of an operating parameter of engine 10 for example.

With valve member 352 in valve-open position P2, air-oil mixture 31 may be received into chamber 350 via inlet 336, and impinged against the upstream surface of valve member 352. The first portion of air-oil mixture 31 may be released from first inlet(s) 338, and the second portion of air-oil mixture 31 may be collected by nozzle 348, guided by nozzle 348 and released from second outlet 340.

FIGS. 8A and 8B are schematic axial cross-sectional views of another exemplary blowdown valve 435 (referred hereinafter as "valve 435"). Valve 435 may have elements similar to those previously described above in relation to valve 35. Like elements have been identified using reference characters incremented by 400. FIG. 8A shows valve member 452 at valve-closed position P1. FIG. 8B shows valve member at valve-open position P2. In various embodiments, valve member 352 may be freely movable (translatable) between valve-closed position P1 and valve-open position P2, may be resiliently biased toward valve-closed position P1 by way of a spring, or may be movable by way of a suitable actuator.

In some embodiments, valve member 452 may have the form of a poppet including a disc attached to an end of a stem. Valve member 452 may be disposed inside cage 446. With valve member 452 in valve-open position P2, air-oil mixture 31 may be received into chamber 450 via inlet 436, and impinged against the upstream surface of valve member 452. The first portion of air-oil mixture 31 may be released from first inlet(s) 438, and the second portion of air-oil mixture 31 may be directed toward nozzle 448 using one or more deflectors 464, collected by nozzle 448, guided by nozzle 448 and released from second outlet 440. In some embodiments, deflector(s) 464 may form part of and movable with valve member 452. Alternatively, deflector(s) 464 may be separate from valve member 452 and have a fixed position associated with valve-open position of valve member 452.

FIG. 9 is a flow diagram of method 1000 of separating oil and air in a lubrication system of engine 10. Method 1000 may be performed using any one of valves 35, 135, 235, 335 and 435 described herein or using other component(s). Aspects of valve 35, 135, 235, 335 and 435 and/or of system 30 may be incorporated into method 1000. Method 1000 may include other steps or actions disclosed herein. Only reference numerals associated with valve 35 are used in the following description for clarity. In various embodiments, method 1000 may include:

receiving air-oil mixture 31 at blowdown valve 35 including valve member movable between valve-closed position P1 where a flow of air-oil mixture 31 through blowdown valve 35 is hindered, and valve-open position P2 where a flow of air-oil mixture 31 through blowdown valve 35 is permitted (block 1002);

with valve member 52 in valve-open position P2:

impinging air-oil mixture 31 against valve member 52 (block 1004);

releasing a first portion of air-oil mixture 31 from blowdown valve 35 upstream of valve member 52, the first portion of air-oil mixture having a first fraction of oil (block 1006);

guiding a second portion of air-oil mixture 31 around and past valve member 52, the second portion of air-oil mixture 31 having a second fraction of oil greater than the first fraction of oil (block 1008); and releasing the second portion of air-oil mixture 31 from blowdown valve 35 downstream of valve member 52 (block 10010).

Valve member 52 may be translatable along central axis A of cage 46. The first portion of air-oil mixture 31 may be release from blowdown valve 35 in a direction transverse to central axis A. The second portion of air-oil mixture 31 may be released from blowdown valve 35 via converging nozzle 48.

The embodiments described in this document provide non-limiting examples of possible implementations of the present technology. Upon review of the present disclosure, a person of ordinary skill in the art will recognize that changes may be made to the embodiments described herein without departing from the scope of the present technology. Modifications could be implemented by a person of ordinary skill in the art in view of the present disclosure, which modifications would be within the scope of the present technology.

What is claimed is:

1. A blowdown valve for an aircraft engine lubrication system, the blowdown valve comprising:
   a valve body defining:
      a chamber;
      an inlet for receiving a mixture of air and lubricating fluid into the chamber;
      a first outlet for releasing a first portion of the mixture out of the chamber; and
      a second outlet for releasing a second portion of the mixture out of the chamber, the second outlet being disposed downstream of the first outlet relative to the inlet; and
   a valve member disposed inside the chamber of the valve body, the valve member being translatable along an axis between:
      a valve-closed position where the valve member hinders fluid flow through the inlet; and
      a valve-open position corresponding to a downstream translation limit of the valve member where:
         fluid flow is permitted through the inlet;
         fluid flow is permitted from the inlet to the first outlet and through the first outlet;
         fluid flow is permitted from the inlet to the second outlet and through the second outlet by flowing radially outwardly around and past the valve member; and
         the valve member is disposed between the inlet and the second outlet.

2. The blowdown valve as defined in claim 1, wherein the first outlet is disposed upstream of the valve member when the valve member is in the valve-open position.

3. The blowdown valve as defined in claim 1, wherein:
   the axis intersects the inlet and the second outlet; and the first outlet includes an opening in the valve body, the opening being transverse to the axis.

4. The blowdown valve as defined in claim 1, wherein the valve body includes a converging nozzle defining the second outlet.

5. The blowdown valve as defined in claim 1, wherein an upstream surface of the valve member has a bulbous shape that is convex toward the inlet.

6. The blowdown valve as defined in claim 1, wherein:
an upstream surface of the valve member facing the inlet has a spherical shape;
the valve body includes a converging nozzle defining the second outlet; and
an upstream end of the nozzle is disposed upstream of a center of a sphere including the upstream surface when the valve member is in the valve-open position.

7. The blowdown valve as defined in claim 6, wherein:
the axis intersects the inlet and the second outlet; and
the first outlet is disposed between the inlet and the second outlet along the axis.

8. The blowdown valve as defined in claim 1, wherein:
the valve body includes a cylindrical cage defining the chamber;
the axis is a central axis of the cylindrical cage;
the valve member includes a ball translatable along the central axis of the cylindrical cage; and
the valve body includes a converging nozzle defining the second outlet.

9. The blowdown valve as defined in claim 8, comprising a plurality of first outlets including the first outlet, the plurality of first outlets respectively including a plurality of openings defined in the cylindrical cage and angularly spaced apart about the central axis.

10. The blowdown valve as defined in claim 8, wherein:
an upstream end of the nozzle is disposed upstream of a center of the ball when the valve member is in the valve-open position; and
a radial gap between the nozzle and the ball defines a passage providing fluid communication between the inlet and the second outlet when the valve member is in the valve-open position.

11. The blowdown valve as defined in claim 1, wherein the valve member is resiliently biased toward the valve-closed position.

12. The blowdown valve as defined in claim 1, wherein the valve member includes a poppet.

13. The blowdown valve as defined in claim 1, comprising an actuator connected to the valve member to cause translation of the valve member.

14. An aircraft engine lubrication system comprising:
a first chamber containing a first lubrication load and receiving oil and pressurized air;
a second chamber containing a second lubrication load and receiving a mixture of the oil and the pressurized air from the first chamber; and
a check valve, the mixture of the oil and the pressurized air from the first chamber being delivered to the second chamber via the check valve, the check valve including:
a valve body defining:
a valve chamber;
an inlet for receiving the mixture into the valve chamber;
a first outlet for releasing a first portion of the mixture out of the valve chamber; and
a second outlet for releasing a second portion of the mixture out of the valve chamber, the second outlet being disposed downstream of the first outlet relative to the inlet; and
a valve member disposed inside the valve chamber of the valve body, the valve member being translatable along an axis between:
a valve-closed position where the valve member hinders fluid flow through the inlet; and
a valve-open position corresponding to a downstream translation limit of the valve member where:
a first fluid passage is defined from the inlet to the first outlet and through the first outlet; and
a second fluid passage is defined from the inlet to the second outlet and through the second outlet, the second fluid passage extending radially outwardly around and past the valve member.

15. The aircraft engine lubrication system as defined in claim 14, wherein:
the first lubrication load includes a bearing; and
the second chamber is a gearbox.

16. The aircraft engine lubrication system as defined in claim 15, wherein the check valve is at least partially disposed inside of the second chamber.

17. The aircraft engine lubrication system as defined in claim 1, comprising a converging nozzle defining the second outlet, wherein the valve member includes a ball at least partially disposed inside of the nozzle when the valve member is in the valve-open position.

18. A method for separating oil and air in a lubrication system of an aircraft engine, the method comprising:
receiving a mixture of air and oil at a blowdown valve including a valve member movable along an axis between a valve-closed position where a flow of the mixture through the blowdown valve is hindered, and a valve-open position corresponding to a downstream translation limit of the valve member where a flow of the mixture through the blowdown valve is permitted;
with the valve member in the valve-open position:
impinging the mixture against the valve member;
releasing a first portion of the mixture from the blowdown valve upstream of the valve member, the first portion of the mixture having a first fraction of oil;
guiding a second portion of the mixture radially outwardly around and past the valve member, the second portion of the mixture having a second fraction of oil greater than the first fraction of oil; and
releasing the second portion of the mixture from the blowdown valve downstream of the valve member.

19. The method as defined in claim 18, wherein
the first portion of the mixture is release from the blowdown valve in a direction transverse to the axis.

20. The method as defined in claim 18, wherein the second portion of the mixture is released from the blowdown valve via a converging nozzle.

* * * * *